TUNNEL DIODE MEMORY SYSTEM
Filed Oct. 22, 1965 2 Sheets-Sheet 1
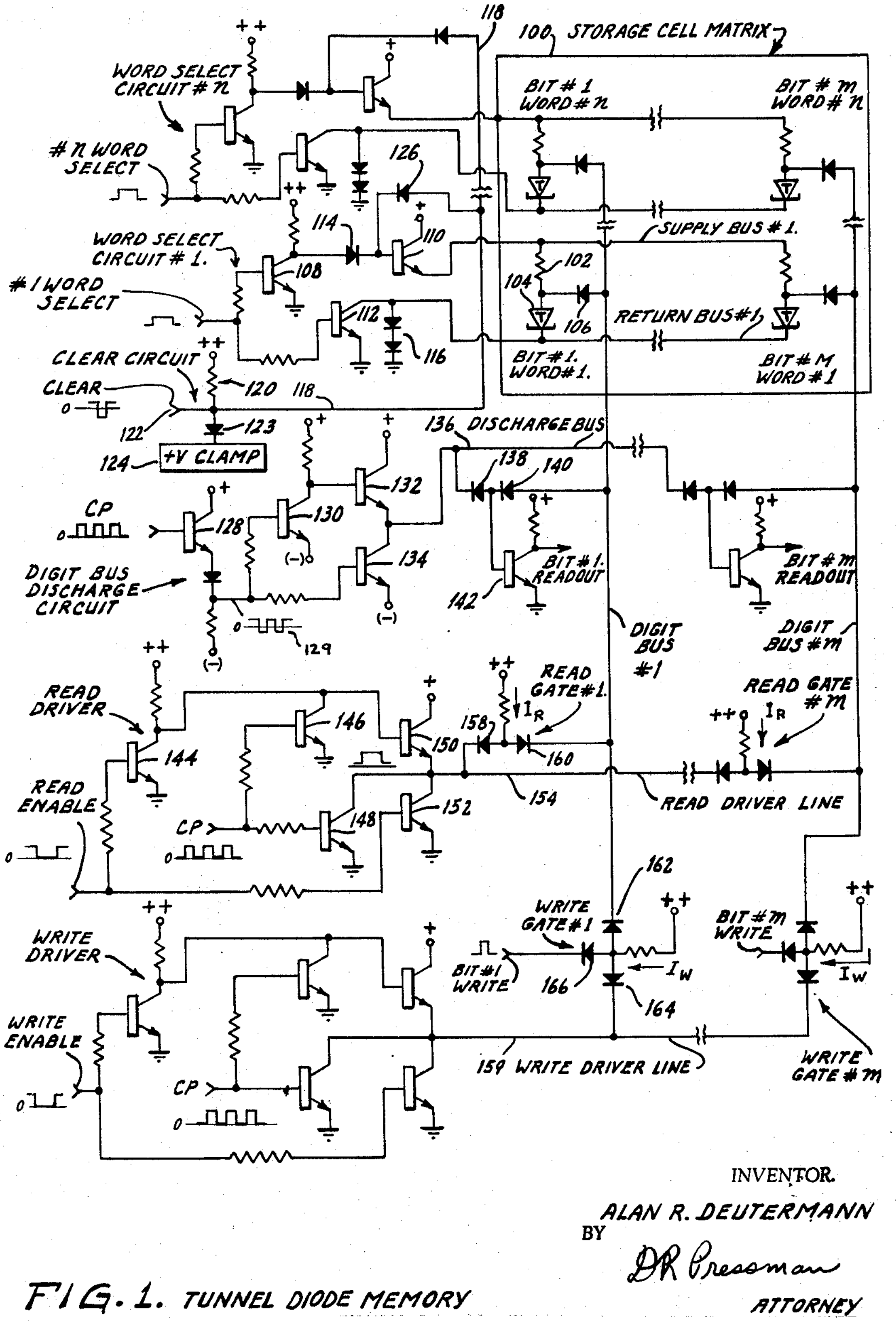
FIG. 1. TUNNEL DIODE MEMORY
INVENTOR.
ALAN R. DEUTERMANN
BY
DR Pressman
ATTORNEY

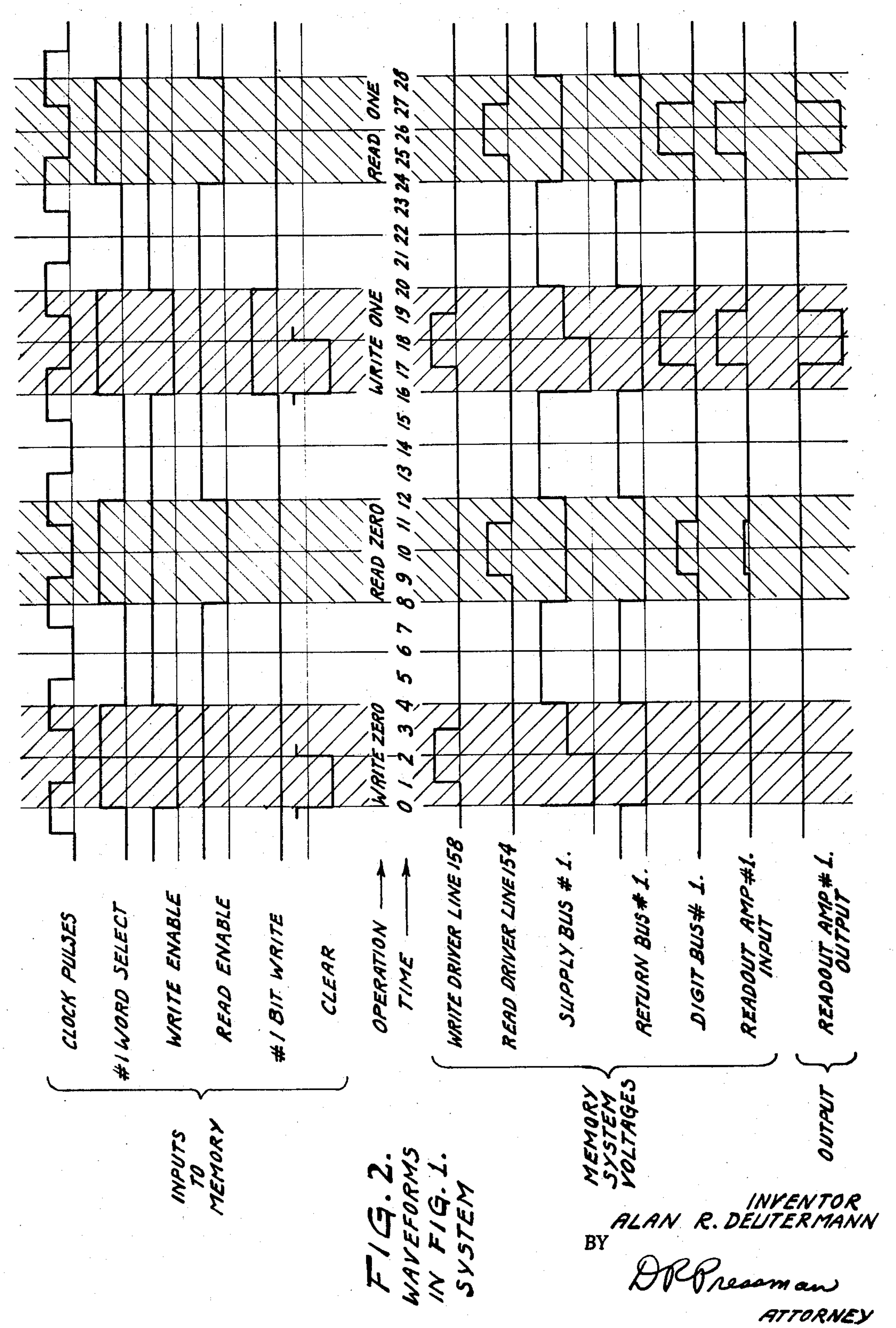
FIG. 2. WAVEFORMS IN FIG. 1. SYSTEM
INVENTOR
ALAN R. DEUTERMANN
BY
D R Pressman
ATTORNEY

3,388,386
TUNNEL DIODE MEMORY SYSTEM

Alan R. Deutermann, Philadelphia, Pa., assignor to Philco-Ford Corporation, a corporation of Delaware Filed Oct. 22, 1965, Ser. No. 501,822
16 Claims. (Cl. 340—173)

The present invention relates to information storage systems and particularly to a high speed digital word-select storage system.

A typical digital word-select storage system is arranged to store a number of words, each of which consists of a plurality of digital bits. Assuming the system is arranged to store *n* words with *m* bits per word, $n \times m$ storage cells will be required, each of which must comprise a bistable storage circuit. Heretofore such bistable storage circuits have comprised two cross coupled tubes or transistor inverting amplifiers. Recently, however, the tunnel diode has become a popular bistable circuit element due to its superior temperature stability, higher speed, lower cost, simplicity, and reliability. Accordingly one object of the present invention is the provision of a novel digital word memory utilizing tunnel diode bistable circuitry.

Other objects of the present invention include: (a) the provision of a novel and improved digital word memory system, (b) the provision of a digital word memory system having superior speed capabilities, and (c) the provision of a tunnel diode digital word memory system having improved reliability and stability. Further objects and advantages of the present invention will become apparent from a consideration of the ensuing description thereof.

SUMMARY

In accordance with the present invention, a digital word-select storage system includes a storage matrix composed of *n* groups of *m* tunnel diode bistable cells each, each group representing a digital word arranged to store *m* binary bits, and each cell representing an individual binary bit. Each word group of cells is connected to a current supply bus and a current return bus and each group of *n* correspondingly positioned cells of different words is connected to one of *m* digit busses. A word is selected for read or write operations by changing the potentials of both its supply and return busses by approximately the same amount. All return busses are normally connected to a reference potential point via a constant voltage versus current impedance and all digit busses are periodically discharged by a digit bus discharging circuit.

DRAWINGS

FIG. 1 shows a schematic diagram of a memory system according to the present invention.

FIG. 2 shows a diagram of waveforms present in the system of FIG. 1.

GENERAL DESCRIPTION OF DIGITAL WORD MEMORY

The digital word memory of the present invention will be more easily understood if the general operation thereof is first described. The digital memory, which is arranged to store *n* words of *m* bits each, has the following inputs and outputs:

*Inputs*

(1) *n* Word Select Inputs
(2) One Clear Input
(3) One Write Enable Input
(4) One Read Enable Input
(5) *m* Bit Write Inputs

*Outputs*

(6) *m* Bit Readouts

The system operates as follows: A word is written into the memory by setting the *m* bistable cells which comprise a particular word into appropriate states representative of binary ONES and ZEROES. This is done by: (1) energizing a particular Word Select Input to select the word in the memory into which the information is to be written, (2) energizing the Write Enable Input to enable the write operation to occur, and (3) supplying appropriate binary ONE and ZERO representative signals to the *m* Bit Write Inputs according to the states to which the *m* bits of the selected word are to be set. During the first part of the interval in which the write operation takes place, a Clear Input is also energized with an appropriate signal to erase any information which was previously written into the storage cells of the word chosen.

The information in a word may be read by: (1) energizing the appropriate Word Select Input, and (2) energizing the Read Enable Input to enable the read operation to occur. The *m* Bit Readouts will be energized with binary voltages representative of the states of the cells in the word.

The present invention also includes several Clock Pulse Inputs to which clock pulses are continuously supplied in parallel fashion for purposes to be discussed.

The following discussion will specifically detail the description and operation of the memory system of the invention.

DESCRIPTION

FIG. 1 is a schematic diagram of an *n*-word, *m*-bit-per-word tunnel diode memory. The storage of digital information per se is performed in the storage cell matrix shown within the rectangle 100 in the upper right corner of FIG. 1. Due to space limitations and for ease of illustration, only the cells of the first and *n*th words are illustrated, and in each of these words only the first and *m*th cells are shown, the missing words and cells and their interconnections being indicated by the broken lines. Each bistable cell consists of a resistor, a tunnel diode, and a conventional gating diode.

*Operation of Tunnel Diode Bistable Cell*

Consider only the bistable cell which comprises Bit #1 of Word #1 (i.e., resistor 102, tunnel diode 104, and gating diode 106). Assume that a direct voltage is applied across the upper terminal of resistor 102 and the cathode of tunnel diode 104 with the upper terminal of the resistor being connected to the positive end of the DC source. This circuit can assume either of two possible stable states: In the first, representative of a binary ZERO, the tunnel diode is in its low voltage, high current, and low impedance state wherein the voltage drop across the tunnel diode is relatively low. In the second, representative of a binary ONE, the tunnel diode is in its high voltage, low current, and high impedance state wherein the voltage drop across the tunnel diode is relatively high.

There are many known ways of shifting the cell from one state to another, but only the one used in the present invention will be stated. The state of the cell is changed by first removing the bias potential thereacross. If the cell is to be set to its ZERO (low voltage) state, no input current is supplied through gating diode 106. When the bias potential is reapplied, the cell will proceed to its ZERO state. To set the cell in its ONE state, a current pulse sufficient to place the tunnel diode in its high voltage state is supplied via gating diode 106. The bias across the cell is reestablished during the current pulse so that when the pulse is removed the diode will remain in its high voltage state.

*Description of Storage Cell Matrix 100*

As stated there are $m \times n$ cells in matrix 100. Each cell has 3 leads connected thereto: a current Supply Bus, a current Return Bus, and a Digit Bus. The Supply Bus is connected in common to the $m$ upper terminals of the resistors in the cells of a word, while the Return Bus is connected in common to the $m$ cathodes of the tunnel diodes in the cells of a word. The Digit Bus is connected in common to the anodes of the $n$ gating diodes belonging to each group of $n$ correspondingly positioned cells of the $n$ different words. The Supply and Return Busses are drawn horizontally in FIG. 1, while the Digit Busses are drawn vertically. The memory has $m$ Digit Busses, of which only the first and $m^{th}$ are shown, and $n$ Supply and $n$ Return Busses, of which only the first and $n^{th}$ are shown of each.

WORD SELECT CIRCUITS

The voltages on the Supply and Return Busses for each word are controlled by one of $n$ Word Select Circuits. Since each Word Select Circuit is identical, only Word Select Circuit #1 will be detailed.

Word Select Circuit #1 includes three transistors 108, 110, and 112. A positive Word Select Pulse is applied in parallel to the bases of transistors 108 and 112 via respective limiting resistors when the related word is to be selected. Transistor 108 is connected as a common emitter amplifier whose collector is connected to the base of transistor 110 via isolating diode 114. The collector of transistor 110 is connected to a positive voltage source and the emitter thereof is connected directly to Supply Bus #1. The collector of transistor 112 is connected directly to Return Bus #1 while the emitter thereof is grounded. Return Bus #1 is also connected to ground by the two series connected diodes 116 which are used for their substantially constant voltage v. current characteristic in their forward biased condition. Any other constant voltage v. current device (e.g., a Zener diode or a gas tube) may be used in lieu of diodes 116.

CLEAR CIRCUIT

The Clear Circuit is arranged to control the potential of bus 118 which is connected in parallel to every Word Select Circuit. The Clear Circuit consists of a bias circuit 120, a diode 123, an input 122, and a clamp source 124. Bus 118 is connected to bias source 120, to Clear Input 122 for receiving negative Clear Pulses, and, via diode 123, to positive clamp voltage source 124. Clear Bus 118 is connected to the base of each of the $n$ transistors similar to transistor 110 via respective isolation diodes similar to diode 126.

*Control Circuitry for Digit Busses*

DIGIT BUS DISCHARGE CIRCUIT AND READOUT AMPLIFIERS

The Digit Bus Discharge Circuit and the Readout Amplifiers are not directly related functionally but will be discussed together because of their physical proximity in the memory system.

The Digit Bus Discharge Circuit includes four transistors, 128, 130, 132, and 134. Positive Clock pulses are applied to the base of transistor 128 which is connected in a circuit arranged to shift the level of the clock pulses in a negative direction. The output of transistor 128 is arranged to drive an inverter transistor 130. Output transistors 132 and 134 are arranged to be driven in push-pull fashion by the outputs of transistors 130 and 128, respectively. Transistors 132 and 134 will thus always be in conductive and nonconductive states, respectively, or viceversa. Discharge Bus 136 is connected to the output of the push-pull circuit 132–134. The Discharge Bus 136 is connected in parallel to each of the $m$ vertical Digit Busses via $m$ pair of diodes, a typical pair being diodes 138 and 140 which connect the Discharge Bus 136 to Digit Bus #1. The junction of each pair of diodes is connected to the input of a respective Readout Amplifier. Each of the $m$ Readout Amplifiers includes a single transistor, a positive bias source, and a collector load resistor. The junction of diodes 138 and 140 is connected to the base of transistor 142 of the Bit #1 Readout Amplifier.

READ DRIVER CIRCUITRY

The Read Driver Circuitry comprises a Read Driver, which is a push-pull amplifying AND gate, and $m$ Read Gates, one connected to each of the Digit Busses.

The Read Driver comprises 5 transistors, 144, 146, 148, 150, and 152. When the Read operation is to occur a Read Enable pulse is applied to the Read Enable input which is connected in parallel to the inputs of transistors 144 and 152. Positive Clock Pulses are continuously applied in parallel to the inputs of transistors 146 and 148. The collectors of transistors 144 and 146 are connected through a common load resistor to a positive source, and to the base of output transistor 150. Thus when the voltages of the Read Enable pulse signal and the Clock Pulses are simultaneously at ground, a positive voltage will be applied to the base of transistor 150 to turn the same on. The collectors of transistors 148 and 152 are commonly connected to the emitter of transistor 150 and to the Read Driver Line 154. When the voltages of the Read Gate signal and the Clock Pulses are simultaneously at ground, transistors 148 and 152 will be nonconductive. From the above it will be apparent that the Read Driver Line 154 will normally be connected to ground through transistor 148 or 152. However, when the Read Enable Gate Signal and the Clock Pulses both are at zero volts, transistors 148 and 152 will be turned off and transistor 150 will be turned on, connecting the Read Driver Line 154 to the positive source at the collector of transistor 150.

Each of the identical $m$ Read Gates is connected between Read Driver Line 154 and one of the Digit Busses. The Read Current Gate #1, which is connected between Digit Bus #1 and Read Driver Line 154 comprises diodes 158 and 160, a positive source, and a limiting resistor. Normally the Read Driver will cause the Read Driver Line to remain at ground potential. In this condition a Read Current $I_R$ will flow from the positive source through diode 158 to the Read Driver Line 154. When the Read Driver causes Read Driver Line 154 to go positive, diode 158 will be back biased and the Read Current $I_R$ will flow through diode 160 to Digit Bus #1.

WRITE DRIVER CIRCUITRY

The Write Driver Circuitry comprises a Write Driver, which is a push-pull amplifying gate identical to the Read Driver, and $m$ Write Gates, one connected to each of the Digit Busses.

The Write Driver receives at its Write Enable input a Write Enable Signal and at its Clock Pulse input the Clock Pulses; its output is connected to the Write Driver Line 159. Normally the Write Driver holds the potential of the Write Driver Line 159 at ground potential, but when the Write Enable Signal and the Clock Pulses are both at ground potential, the Write Driver Line is made positive.

Each of the $m$ Write Gates comprises three diodes, a positive voltage source, and a resistor. Consider Write Gate #1 which controls the Digit Bus #1. Write Gate #1 includes a first diode 162 connected to Digit Bus #1, a second diode 164 connected to the Write Driver Line 159, and a third diode 166 connected to the Bit #1 Write input. To the junction of all three diodes is connected the aforementioned positive voltage source and resistor which supply a Write Current, $I_W$.

The Write Current Gates operate similarly to the Read Current Gates, except that the former additionally includes a Bit Write input. Normally the Write Current $I_W$ will flow out through diodes 164 and 166 to the Write Driver Line 159 and the Bit Write input. However when the Write Driver Line 159 and the Bit Write Input both go positive, diodes 164 and 166 will be back-biased and $I_W$ will flow through diode 162 to Digit Bus #1. $I_W$ is arranged to be greater than $I_R$.

OPERATION

The operation of the memory can best be understood if the operation of the Storage Cell Matrix 100 per se is first described. Thereafter the operation of the driving circuitry will be described, and then the entire memory system will be described with reference to the waveform diagram of FIG. 2.

*Operation of Storage Cell Matrix 100*

The operation of Matrix 100 will be described in four parts inasmuch as Matrix 100 has four modes of operation: Clear, Write, Store, and Read.

In the Clear mode, the information stored in the cells of any particular word is erased. This is effected by removing the voltage on a particular Supply Bus which will, of course, reduce the currents in all of the cells of a corresponding word to zero.

In the Write Mode, the cells of a word are set into the desired states. The Write Mode occurs in an interval which overlaps the Clear Mode; thus before the Clear Mode is terminated by reestablishing the Supply Bus voltage, the correct currents will have already been established in the cells of the word by the Write operation. This operation consists of supplying a Write Current $I_W$ on the proper Digit Bus if a binary ONE is to be written into the cell or no current if a binary ZERO is to be written into the cell. When a ONE is written, the current $I_W$ on the Digit Bus will flow through the cell's gating diode (e.g., diode 106) and the cell's tunnel diode, placing the tunnel diode in its high voltage state. When the voltage on the Current Supply Bus is reestablished and the Write Current removed, the tunnel diode will remain in its high voltage state. When a ZERO is written, no Write Current will be supplied on the Digit Bus, so that when the voltage of the Supply Bus is reestablished the tunnel diode will assume its low voltage state.

All the Digit Busses are "active" during a write operation so that all of the cells of the chosen word may be set to the proper states. During the Write interval the potential of both the Supply Bus and the Return Bus will be shifted downward an equal amount. This will lower the cathode potentials of all the gating diodes in the cells of the word to permit the write currents to flow into these cells. The write currents will be unable to affect any other words since all the gating diode cathode potentials of these words will be high enough to block the write currents.

In order to select a word (i.e., lower the cathode potentials of the gating diodes thereof) it is necessary only to lower the potential of the Return Bus of the word. However by lowering the potentials of both Supply and Return Busses simultaneously according to the invention an increased measure of reliability and hence greater operating speed is obtainable.

In the Read Mode of operation the Supply and Return Busses of the selected word are similarly shifted downward to unblock the normally reverse-biased gating diodes of the $m$ cells in said word. Also $m$ Read Currents are supplied on the Digit Busses. These Read Currents flow through the unblocked gating diodes and also the tunnel diodes of the cells of the selected word. If the tunnel diode of a cell is in its low impedance, low voltage (ZERO) state, a relatively large current will flow therethrough causing the voltage on the associated Digit Bus to be relatively low due to a relatively large drop in the Read Current Supply resistor. On the other hand, if the tunnel diode of a cell is in its high impedance, high voltage (ONE) state, a lesser read current will flow on the associated Digit Bus due to a relatively small drop in Read Current Supply resistor. Read Bus voltages are thus indicative of the states of the cells in the selected word.

It should be noted that the Read operation is nondestructive because the Read Current is less than the Write Current and not sufficient to change the state of a tunnel diode.

*Operation of Memory System Driving Circuitry*

WORD SELECT CIRCUITRY

As stated the Word Select Circuitry operates primarily to shift the potentials of the Supply and Return Busses of a selected word downward to unblock the conventional gating diodes of the cells of said word.

Assume that no input is supplied to the input of the #1 Word Select Circuit. Transistors 108 and 112 will be cut off. The potential of Return Bus #1 will be equal to the cumulative forward voltage drops of diodes 116, irrespective of the number of conducting cells in word #1 and hence the current through diodes 116. This is an advantageous feature of the memory system since it provides stability and enables a very high operating speed without the likelihood of errors.

The potential of Supply Bus #1 is equal, of course, to the emitter voltage of transistor 110, which, in turn, is equal to the collector supply voltage of transistor 108, less a constant amount equal to the forward drop across diode 114 and the base-emitter diode of transistor 110.

Assume that Word #1 is selected, i.e., that a positive Word Select Pulse is supplied to the input of Word Select Circuit #1. Transistor 112 will be driven to saturation, lowering the voltage of Return Bus #1 substantially to ground. Transistor 108 will also be driven to saturation and its collector voltage will fall to ground. Diode 114 will become reverse biased due to the positive voltage supplied to its cathode from line 118 via diode 126. The potential of line 118 will now control the voltage of Supply Bus #1. Line 118 will supply current via diode 126 and the base-emitter diode of transistor 110. The voltage of line 118 should be chosen so that the Supply Bus voltage will have been lowered the same amount as the Return Bus voltage, i.e., the voltage across the Supply and Return Busses will remain constant whether or not the word is selected. The voltage of line 118 is controlled by clamp voltage source 124.

When a particular word is to be cleared, a negative Clear pulse is supplied to clear input 122 and a Word Select pulse is supplied to the desired Word Select Circuit. The Clear pulse will cause diode 123 to be back-biased, disengaging clamp voltage 124 and lowering the voltage of line 118 below ground. This will back bias all the diodes similar to 126, effectively removing line 118 from the Word Select Circuits. If a Word Select Pulse is supplied to Word Select Circuit #1, transistor 108 will be saturated, cutting off transistor 110, and removing the current supply to Supply Bus #1.

It is thus seen that energization of a particular Word Select Circuit will lower the potentials of the Supply and Return Busses of said word, while concomitant energization of the Clear input 122 will also remove the current supply for the Supply Bus of said word.

DIGIT BUS DISCHARGE CIRCUIT AND READOUT AMPLIFIERS

The Digit Bus Discharge Circuit functions to periodically discharge the capacitance associated with the $m$ Digit Busses. The Discharge Circuit enables the memory system to operate at very high speeds by preventing false triggering, as will be shown below in the discussion of the waveform diagram of FIG. 2. It will suffice for the present to note that inasmuch as the Digit Busses are each connected to $n$ cell gating diodes similar to diode 106, and since each diode has a junction capacitance, that each Digit Bus is effectively connected to a capacitance having a value of $nC_{GD}$, where $C_{GD}$ is the capacitance of a single gating diode. This capacitance is charged during certain circuit operations and must be discharged before certain succeeding operations can occur. The Discharge Circuit is provided to rapidly discharge the Digit Busses so that the succeeding operations can be made to occur soon after the operations which charge the Digit Busses.

Clock Pulses are supplied at the input of level shifting transistor 128 of the discharge circuit. These Clock pulses are phased so the aforementioned circuit operations which charge the Digit Busses may occur when the clock pulse waveform is at ground. Transistor 128 is in an emitter follower circuit designed to shift the voltage level of the clock pulses downwardly to provide waveform 129 which is negative when the clock pulses are at ground. The negative intervals of waveform 129 will turn transistor 130 off, which will turn on transistor 132, the upper of the push-pull output transistors 132 and 134. (Transistor 134 will be turned off by the negative input thereto due to waveform 129.) This will cause Discharge Line 136 to be connected to the positive source at the collector of transistor 132, thereby back biasing all diodes similar to 138 and disconnecting the Digit Busses and the Bit Readout Amplifiers from the Bus Discharge Circuit.

When the Clock Pulse waveform is positive, it will be seen from waveform 129 that transistors 130 and 134 will receive a positive input. This will turn both transistors on. The output of transistor 130 will be negative, turning transistor 132 off and disconnecting the Discharge Line 136 from the positive source. Transistor 134 will connect line 136 to the negative source at the emitter, forward biasing all diodes similar to 138 and 140 and discharging the Digit Busses. The negative source at the emitter of transistor 134 is selected to be equal to the voltage drop across transistor 134 when saturated, plus the drops across diodes 138 and 140, so that the Digit Busses will be effectively connected to ground during the discharging intervals when the Clock Pulse waveform is positive.

Each of the Readout Amplifiers is arranged to amplify the voltage on its associated Digit Bus. The diodes similar to 140 are designed to provide a small voltage drop to prevent a slightly positive voltage on a Digit Bus (when a ZERO is being read) from turning on the Readout Amplifier transistor.

READ AND WRITE DRIVERS

As previously discussed, the Read Driver allows the Read Currents, $I_R$, to be routed to the Digit Busses when the Read Enable Signal and the Clock Pulses are both at ground.

As also discussed, when the Write Driver receives ground voltages from both the Write Enable Signal and the Clock Pulses, a Write Current, $I_W$, will be supplied to those Digit Busses having a Write Pulse applied thereto. These Write currents will set the appropriate cells of the selected Word into ONE states, while those cells not receiving write currents will be set into ZERO states.

*FIG. 2—Waveform diagram*

The waveform diagram of FIG. 2, which is not precisely scaled vertically, illustrates the operation of the memory system. The operation can be easily understood if four exemplary operations of the cell comprising Bit #1 of Word #1 are discussed. These operations are Write ZERO, Read ZERO, Write ONE, and Read ONE. The numbers at the center of FIG. 2 denote successive time intervals. A read or write operation requires a period of four time intervals and this period must be phased so that the clock pulse signal, which is continuously supplied to the memory, is at ground during the second and third quarters of the period.

*WRITE ZERO*

It will be assumed that a ZERO is to be written into Bit #1 of Word #1 in the period from T0 to T4. During this period a Word Select Pulse is supplied to Word Select Circuit #1 to unblock gating diode 106 (and all other gating diodes of Word 1). The Write Enable signal is at ground, causing the Write Driver to enable the Write Current gates by making the Write Driver Line 158 positive from T1 to T3 (when the Clock Pulse signal is at ground). During the first half of the period, the negative Clear pulse signal is supplied. This effectively disconnects Supply Bus #1 from any positive source and thereby erases any information stored in Word #1. To write a ZERO, no Bit Write input pulse is supplied to Write Current gate #1; thus when the negative Clear Pulse is removed, the voltage of Supply Bus #1 will be reestablished and tunnel diode 104 will proceed to its low voltage or ZERO state. The Word Select Pulse is removed at T4, and diode 106 will again be back biased.

*READ ZERO*

It will be assumed that Word #1 is to be read in the period from T8 to T12. During this period the #1 Word Select pulse is supplied to unblock diode 106 and all other similar diodes, the Read Gate Signal is at ground so that the Driver Line 154 will be positive from T9 to T11. Since the tunnel diode 104 of Bit #1 of Word #1 is in its low impedance state, $I_R$ will be relatively large on Digit Bus #1; thus this Bus will have a relatively small voltage rise. Most or all of this rise will be dropped across diode 140 so that Readout Amplifier #1 will not receive an input sufficiently positive to turn it on. Consequently the output of Readout Amplifier #1 will be at ground, indicating that a ZERO was stored in Bit #1 of Word #1.

It will be noted that the Clock Pulse Signal is positive from T11 to T13. This positive voltage will cause the Bit Line Discharge Circuit to effectively ground all the Bit Lines during this interval. This will quickly remove the charge left on the Bit Lines by the Read Current during T9 to T11.

*WRITE ONE*

During the period from T16 to T20 a ONE is written into Bit #1 of Word #1. This operation is similar to the "WRITE ZERO" operation except that a positive pulse is also applied to the #1 Bit Write Input from T16 to T20. This allows a Write Current, $I_W$, to flow through diode 162, over Digit Bus #1, and into tunnel diode 104 to place the latter in its high voltage state. When the Clear Pulse is removed at T18 the voltage across the cell will be reestablished and so that when the Write Current is removed, the tunnel diode 104 will remain in its high voltage state.

It should be noted that the Write ONE operation caused Digit Bus #1 to assume a relatively high voltage from T17 to T19 due to tunnel diode 104 being placed in its high impedance (ONE) state by $I_W$. Thus aforediscussed relatively high capacitance associated with Digit Bus #1 was charged by $I_W$ to this relatively high voltage. When the memory is operated at high speeds this charge will not have timet o leak away by the time the next word is selected and accordingly will cause a current to flow into the associated bit of the selected word, setting it to its ONE state. Accordingly it will be appreciated that the operating speed of memory without means for discharging this capacitance rapidly tends to be limited by the discharge time of the Digit Bus capacitance.

The Digit Bus Discharge Circuit of the present invention obviates this speed limitation by discharging all the Digit Bus capacitances in the fourth and first quarters of every word period. Thus from T19 to T21 the Clock Pulse signal will cause the Discharge circuit to effectively ground the Digit Busses and discharge the capacitance associated therewith.

*READ ONE (T24–T28)*

This operation is similar to the READ ZERO operation with the following exceptions. Since tunnel diode 104 is in its high impedance state, a relatively small Read Current, $I_R$, will flow from T25 to T27, thus placing a relatively high voltage on Digit Bus #1. This voltage will be dropped only slightly by diode 140; thus the input to Read Amplifier #1 will be sufficient to turn the same on, providing a negative output pulse indicative that a ONE is stored in Bit #1 of Wood #1.

SUMMARY

A high speed $n$ word, $m$ Bit-per-word tunnel diode memory has been shown. The reliability and high operating speed of the memory is founded principally upon the following features: (1) the use of inherently high speed tunnel diode memory cells, (2) the use of a constant voltage device (diodes 116) to establish a constant Return Bus Word Line potential irrespective of the states of the cells in the selected word, (3) the use of the Word Select Circuits in conjunction with the Clamp circuit to simultaneously shift the potentials of the Supply and Return Busses an equal amount, (4) the use of the Digit Bus Discharge Circuit to periodically discharge the deleterious Digit Bus capacitance, and (5) the use of push-pull line drivers.

It should be noted that the waveforms of FIG. 2 have been idealized in shape for facilitation of illustration.

A memory constructed according to the invention has been successfully operated at a speed of 20 megacycles per second.

While there has been described what is at present considered to be the preferred embodiment of the invention it will be apparent that various modifications and other embodiments thereof will occur to those skilled in the art within the scope of the invention. Accordingly, it is desired that the scope of the invention be limited by the appended claims only.

I claim:

1. In combination:

(a) a plurality of bistable storage cells, each cell having first, second, and third terminals, the impedance between said first and second terminals being capable of assuming two stable values for a predetermined potential applied thereacross, said impedance value being controllable by a signal applied across said third terminal and a reference point when the potential of said second terminal is substantially the same as that of said reference point, and (b) means for: (1) applying first and second voltages to the first and second terminals, respectively, of all of said cells, the difference between said first and second voltages being equal to said predetermined potential, and (2) controllably shifting the value of each of said voltages a like amount so that the potential of said second voltage is substantially the same as that of said reference point.

2. The combination of claim 1 wherein said storage cells each comprise a resistive impedance, a tunnel diode, and a conventional diode, one terminal of each being connected to form a common junction, the other terminals of each being connected to said first, second, and third terminals, respectively.

3. In combination:

(a) a plurality of bistable memory cells, each cell having first, second, and third terminals, a tunnel diode and a resistor connected in series across said first and second terminals, and a rectifying diode connected from the junction of said tunnel diode and said resistor to said third terminal, the first terminals of all of said cells being connected together to a first bus, the second terminals of all of said cells being connected together to a second bus, (b) means for supplying a voltage across a reference point and said first bus, and (c) means having a substantially constant voltage versus current characteristic connecting said second bus to said reference point.

4. The combination of claim 3 wherein said means of clause (c) comprises at least one rectifying diode.

5. The combination of claim 3 wherein said means of clause (c) comprises a plurality of rectifying diodes connected in series.

6. The combination of claim 3 including means for selectively bypassing said means of clause (c) with an impedance substantially lower than said means of clause (c).

7. In combination:

(a) a group of bistable cells, each cell comprising a tunnel diode, a resistor, and a rectifying diode, each having one terminal connected to a common junction, (b) a bus connected to the other terminal of each rectifying diode, said bus having an effective capacitance determined by the capacitances of the rectifying diodes of said group of cells, (c) means for supplying an operating potential across the other terminal of each tunnel diode and the other terminal of each resistor, (d) means for intermittently supplying read and write signals to said bus, whereby the capacitance of said bus is intermittently charged, and (e) means for periodically discharging said capacitance.

8. The invention of claim 7 including a plurality of groups of bistable cells and a corresponding plurality of busses, and wherein said means for supplying an operating potential is arranged to supply operating potential to all of the cells in said plurality of groups and including means for supplying read and write signals to said plurality of busses, said means of clause (e) being arranged to discharge the capacitance of said plurality of busses.

9. In combination:

(a) a reference potential point, (b) a plurality of bistable cells, each cell having first, second, and third terminals and arranged to have two stable impedance values between said first and second terminals for a predetermined potential difference thereacross, said impedance value being controllable by a signal applied across said third terminal and said reference potential point when the potential of said second terminal is substantially the same as said reference point, (c) a first bus connecting the first terminals of all of said cells, (d) a second bus connecting the second terminals of all of said cells, (e) a first transistor having a collector connected to a bias source, a base, and an emitter connected to said first bus, (f) an impedance connecting said second bus to said reference potential point, (g) a second transistor having its emitter and collector connected across said impedance, and (h) means for selectively supplying either one of two different values of voltage to the base of said first transistor and for simultaneously rendering said second transistor either conductive or non-conductive.

10. The combination of claim 9 wherein said impedance of clause (f) has a constant voltage versus current characteristic and wherein said means of clause (h) includes two different voltage sources, each connected to the base of said first transistor by a diode, and means for selectively reducing the voltage of the greater of said sources below the voltage of the lesser of said sources.

11. The invention of claim 10 wherein each of said cells comprises a resistor, a tunnel diode, and a rectifying diode, one terminal of each being connected to a common junction, the other terminals of said resistor, said tunnel diode, and said rectifying diode being connected to said first, second, and third terminals respectively.

12. A memory system comprising in combination:

(a) a matrix comprising $n$ groups of $m$ memory cells each, $n$ and $m$ being integers greater than one, each cell having first, second, and third terminals, one terminal of a resistor connected to said first terminal, one terminal of a tunnel diode connected to said second terminal, and one terminal of a conventional diode connected to said third terminal, the other terminals of said resistor, tunnel diode, and conventional diode being connected to a common junction, (b) $n$ first busses, each connected to the first terminals of the cells in a group, (c) $n$ second busses, each connected to the second terminals of the cells in a group, (d) $m$ third busses, each connected to the third terminals of corresponding cells in each of the $n$ groups, (e) $n$ means, each connected to the first and second busses of a group of cells, for supplying first and second bias voltages to said first and second busses, respectively, the difference between said first and second voltages being such as to allow each of said cells to assume two stable states, each of said means also arranged to selectively change said first and second voltages by an equal amount, whereby the voltages at the common junctions of the cells of a word is changed from a first value to a second value, (f) means, associated with each of said $n$ means, for selectively removing the first voltage on the first bus of a group of cells whenever the first and second voltages of a group of cells are changed by said amount, (g) means for selectively supplying a write signal to each of said third busses, the potential of said write signal with respect to the common junction of a cell lying between said first and second values, said write signal being capable of supplying a current sufficient to drive the tunnel diode of a cell to its high voltage state, and (h) means for selectively supplying a read signal to all of said third busses, the potential of said read signal with respect to the common junction of a cell lying between said first and second values, said read signal arranged to supply a current insufficient to change the state of the tunnel diode of a cell.

13. The system of claim 12 further including means for selectively discharging each of said third busses.

14. The system of claim 12 further including $m$ read amplifiers, each connected to one of said third busses.

15. The system of claim 12 wherein each of said means of clause (e) comprises a first transistor, the collector of which is connected to a source of bias potential, the emitter of which is connected to said first bus, and the base of which is connected to a first voltage source; an impedance having a constant voltage versus current characteristic connecting said second bus to a reference potential point; and means for selectively bypassing said impedance for connecting said second bus to said reference potential point.

16. The system of claim 12 wherein each of said means of clause (e) comprises first, second, and third transistors, the collector and emitter of the first being connected to a source of bias potential and said first bus, respectively, the collector and emitter of the second being connected to said second bus and a reference potential point, respectively, a plurality of diodes having a constant voltage versus current characteristic connected in series between said second bus and reference potential, the collector and emitter of said third transistor being connected to a voltage source via a resistor and said point at reference potential, respectively, the bases of said second and third transistors being connected to a common input terminal, a second diode connecting the base of said first transistor to the collector of said third transistor and to a fourth bus, a voltage source, a resistor connecting said fourth bus to said voltage source, a clamp voltage source, and a third diode connecting said fourth bus to said clamp voltage source.

References Cited

UNITED STATES PATENTS

| | | | |
|---|---|---|---|
| 3,107,345 | 10/1963 | Gruodis | 340—173 |
| 3,141,097 | 7/1964 | Grubb | 340—173 X |
| 3,143,725 | 8/1964 | Henle | 340—173 |
| 3,206,730 | 9/1965 | Igarashi | 340—173 |

BERNARD KONICK, *Primary Examiner.*

J. F. BREIMAYER, *Assistant Examiner.*